(12) United States Patent
Peuser

(10) Patent No.: US 7,936,092 B2
(45) Date of Patent: May 3, 2011

(54) METHOD AND DEVICE FOR PROVIDING A SUPPLY VOLTAGE BY MEANS OF GENERATOR UNITS CONNECTED IN PARALLEL

(75) Inventor: Thomas Peuser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 244 days.

(21) Appl. No.: 12/087,640

(22) PCT Filed: Jan. 12, 2007

(86) PCT No.: PCT/EP2007/050305
§ 371 (c)(1),
(2), (4) Date: Nov. 14, 2008

(87) PCT Pub. No.: WO2007/082850
PCT Pub. Date: Jul. 26, 2007

(65) Prior Publication Data
US 2010/0007207 A1    Jan. 14, 2010

(30) Foreign Application Priority Data
Jan. 16, 2006    (DE) .......................... 10 2006 001 984

(51) Int. Cl.
*H02P 9/00*    (2006.01)
(52) U.S. Cl. ............. 307/84; 307/9.1; 307/10.1; 307/43

(58) Field of Classification Search ................ 307/84, 307/9.1, 10.1, 43
See application file for complete search history.

(56) References Cited

U.S. PATENT DOCUMENTS

| 5,233,229 | A | | 8/1993 | Kohl et al. | |
|---|---|---|---|---|---|
| 5,254,936 | A | * | 10/1993 | Leaf et al. | 322/90 |
| 5,739,676 | A | * | 4/1998 | Judge et al. | 322/22 |
| 6,218,813 | B1 | * | 4/2001 | Davis | 322/20 |
| 7,019,495 | B2 | * | 3/2006 | Patterson | 322/7 |
| 2005/0046396 | A1 | * | 3/2005 | Patterson | 322/28 |

FOREIGN PATENT DOCUMENTS

| DE | 41 08 861 | 10/1992 |
|---|---|---|
| DE | 197 04 662 | 8/1998 |
| DE | 10 2005 012 270 | 9/2006 |
| EP | 1 511 151 | 3/2005 |
| WO | WO 01/82445 | 11/2001 |

\* cited by examiner

*Primary Examiner* — Jared J Fureman
*Assistant Examiner* — Adi Amrany
(74) *Attorney, Agent, or Firm* — Kenyon & Kenyon LLP

(57) ABSTRACT

A method and a device are provided for providing a supply voltage for the consumers of a vehicle electrical system, using generator units connected in parallel. The measurement voltage inputs and the monitor outputs of the controllers of the generator units are used in the initialization phase for the assignment of master or slave function, as well as for address assignment if warranted, and during later parallel operation are used to bring the degree of utilization of the generators of the generator units connected in parallel into agreement.

18 Claims, 1 Drawing Sheet

METHOD AND DEVICE FOR PROVIDING A SUPPLY VOLTAGE BY MEANS OF GENERATOR UNITS CONNECTED IN PARALLEL

BACKGROUND OF THE INVENTION

1. Field of the Invention

The present invention relates to a method and a device for providing a supply voltage using generator units connected in parallel, for example, for a motor vehicle.

2. Description of Related Art

It is already known to supply power to the on-board electrical system of a motor vehicle using a generator.

In addition, it is already known to use at least two generators to supply energy to the onboard electrical system of certain vehicles, for example security vehicles, rescue vehicles, and utility vehicles, in order to ensure that the power requirements and/or the reliability requirements of the electrical supply are met.

The wear, and thus also the life span, of a generator are a function of several factors. One of these factors is the electrical utilization of the generator. The greater the electrical utilization of a generator, the greater is its wear, and the shorter its remaining life span. It is therefore desirable, in devices for providing the voltage supply to the consumers of a vehicle electrical system using a plurality of generators, to ensure that the degree of utilization of the generators used is the same.

In German patent document DE 10 2005 12 270.1, a method and a device are described for providing the supply voltage for the consumers of a vehicle electrical system using a plurality of generators. A control unit having at least one power transistor is allocated to each of the generators. In order to bring the degree of utilization of the generators into agreement, in one of the control units a pulse-width-modulated control signal, or a control signal derived therefrom that describes the pulse-duty factor of the pulse-width-modulated signal, is formed and is supplied to the power transistors of all the control units.

In addition, from published German patent document DE 41 08 861 a device is known having generators connected in parallel. In this known device, a voltage controller is allocated to each of the generators. In addition, the known device has at least one battery of which one terminal is capable of being connected to the voltage controller via an ignition switch. In addition, a charge control device is provided that is connected to the ignition switch and to the voltage regulators, and that is capable of being connected via a switching device to the negative terminal of the battery, which is preferably connected to ground. Between the charge control device, the voltage controllers, and the named switching device, there is situated a circuit system having a plurality of components that conduct in one direction and that block in one direction. This known device is intended to achieve the effect that through the use of two generators a high electrical power can be produced, and that using a single display device, for example a charge control lamp, errors that occur in one of the two generator-voltage controller systems can be signaled, while the other generator-voltage controller system can continue to operate without problems.

BRIEF SUMMARY OF THE INVENTION

A method according to the present invention has the advantage that in connection with the provision of a supply voltage using generator units connected in parallel, each having a controller and a generator, no additional connections to the controllers are required in order to realize an assignment of master and slave functions, a balancing of the load distribution, and, if warranted, an address assignment.

This advantage is essentially achieved in that terminals of the controller that are already present anyway, namely the measurement voltage inputs and the monitor outputs, are used in the initialization phase for a different purpose than during later parallel operation. In the initialization phase, the named terminals are used in order to assign master or slave function, and, if required, also for address assignment. In subsequent parallel operation, a measurement voltage is supplied to the measurement voltage input of the controller of the generator unit performing the master function, and the controller determines a generator control signal for the associated generator on the basis of this supplied measurement voltage. At the monitor output of this controller, a monitor signal is outputted that describes the utilization of the generator. This monitor signal is supplied to the measurement voltage inputs of the controller of the other generator units in order to bring the degree of utilization of the generators into agreement.

Preferably, in the initialization phase the first generator unit assigns itself the master function on the basis of a direct voltage value supplied to the measurement voltage input of its controller. The other generator units identify themselves as slaves when, at this time, reference potential is adjacent to their measurement voltage inputs.

Advantageously, during the initialization phase the controller of the generator unit performing the master function also initiates the address assignment to the individual additional generator units, by providing at its monitor output an identifier signal that is supplied to the measurement signal input of the controller of a downstream generator unit. On the basis of this identifier signal, the controller of the downstream generator unit identifies its position, assigns itself an individual address, and makes available at its monitor output a modified identifier signal. This signal is in turn supplied to the measurement signal input of the controller of a subsequent generator unit, which recognizes its position and assigns itself an individual address, and so on.

In later parallel operation, the measurement signal inputs of the controllers of the additional generator units are used to supply to the respective generator unit a signal that enables a balancing of the loads of the generators.

DETAILED DESCRIPTION OF THE INVENTION

Figure 1:
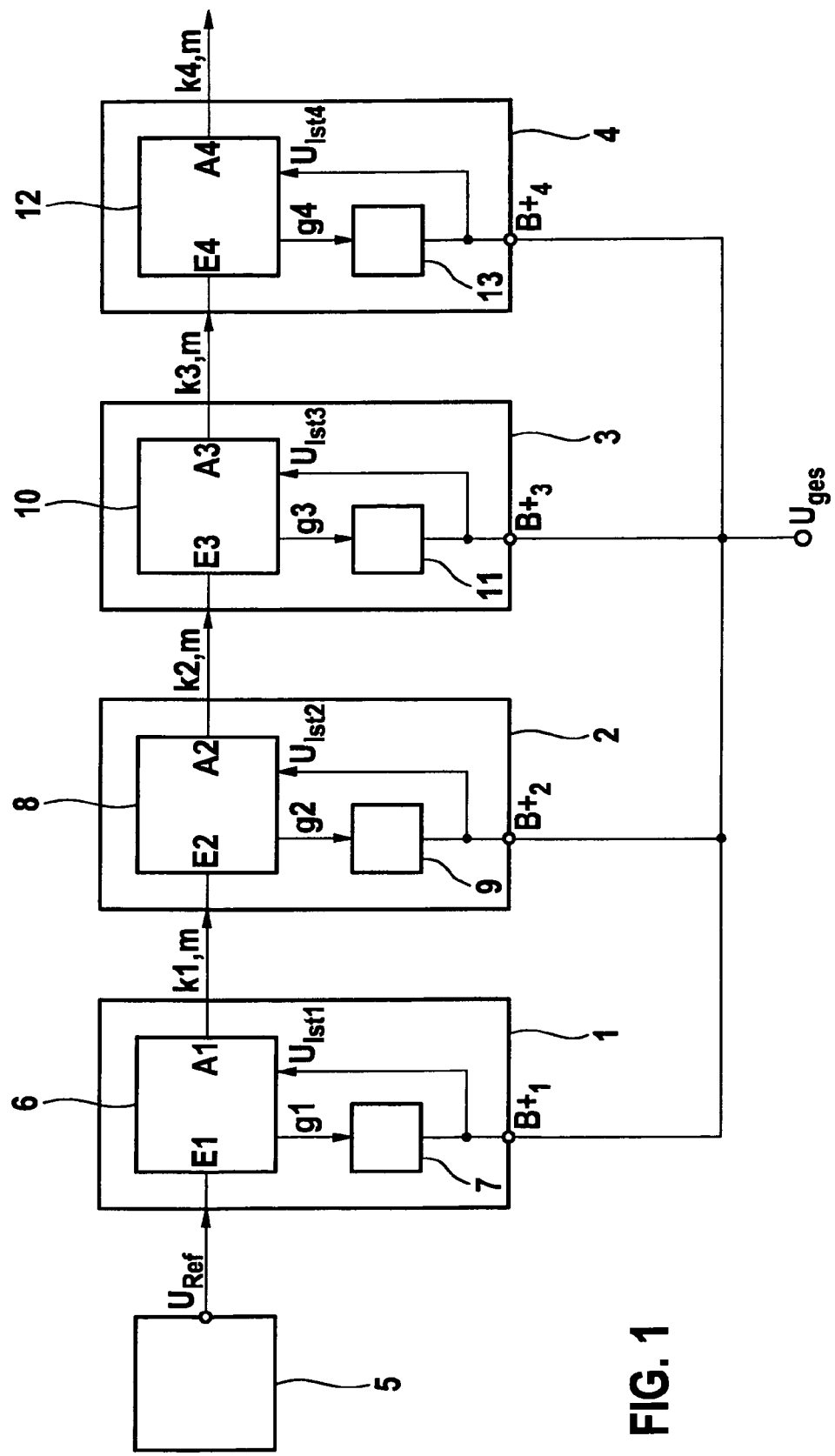
FIG. 1 shows a block diagram for the explanation of a method and of a device for providing a supply voltage for the electrical system consumers of a motor vehicle.

FIG. 1 shows a block diagram for the explanation of a method and of a device for providing a supply voltage $U_{ges}$ using generator units connected in parallel.

In this block diagram, a first generator unit 1, a second generator unit 2, a third generator unit 3, and a fourth generator unit 4 are shown. Positive direct supply voltages $B+_1$, $B+_2$, $B+_3$, $B+_4$ are provided at the voltage supply outputs of these generator units.

Because these supply voltage outputs are connected to one another, the overall provided supply voltage $U_{ges}$ is composed of the supply voltages provided by generator units 1, 2, 3, and 4. This parallel connection of a plurality of generator units ensures that the power required during operation, and the required reliability of the supply of voltage to the consumers of a vehicle electrical system, are present.

Generator unit 1 has a controller 6 and a generator 7. Controller 6 has the task of determining generator control signals g1 and supplying these signals to generator 7. At the output of generator 7, direct supply voltage B+$_1$ produced by this generator is available, which is also provided at an output of generator unit 1. In addition, the direct supply voltage produced by generator 7 is fed back, as voltage actual value U$_{ist1}$, to controller 6, and is taken into account by this controller in the determination of generator control signals g1. In addition, controller 6 has a measurement voltage input E1 and a monitor output A1. Measurement voltage input E1 of controller 6 is connected to an external voltage terminal U$_{Ref}$ that, in the depicted exemplary embodiment, is a voltage terminal of a control device 5. At this voltage terminal, battery voltage U$_B$ is provided, for example after starting the engine of the motor vehicle or after a reset process. Monitor output A1 of controller 6 is connected to measurement voltage input E2 of controller 8 of second generator unit 2.

Generator unit 2 has a controller 8 and a generator 9. Controller 8 has the task of determining generator control signals g2 and supplying them to generator 9. At the output of generator 9, direct supply voltage B+$_2$ produced by this generator is provided, which voltage is also provided at an output of generator unit 2. In addition, the direct supply voltage produced by generator 9 is fed back, as voltage actual value U$_{ist2}$, to controller 8, and is taken into account by this controller in the determination of generator control signals g2. In addition, controller 8 has a measurement voltage input E2 and a monitor output A2. Measurement voltage input E2 of controller 8 is connected to monitor output A1 of controller 6 of first generator unit 1. Monitor output A2 of controller 8 is connected to measurement voltage input E3 of controller 10 of third generator unit 3.

Generator unit 3 has a controller 10 and a generator 11. Controller 10 has the task of determining generator control signals g3 and supplying them to generator 11. At the output of generator 11, direct supply voltage B+$_3$ produced by this generator is provided, which voltage is also provided at an output of generator unit 3. In addition, the direct supply voltage produced by generator 11 is fed back, as voltage actual value U$_{ist3}$, to controller 10, and is taken into account by this controller in the determination of generator control signals g3. In addition, controller 10 has a measurement voltage input E3 and a monitor output A3. Measurement voltage input E3 of controller 10 is connected to monitor output A2 of controller 8 of second generator unit 2. Monitor output A3 of controller 10 is connected to measurement voltage input E4 of controller 12 of fourth generator unit 4.

Generator unit 4 has a controller 12 and a generator 13. Controller 12 has the task of determining generator control signals g4 and supplying them to generator 13. At the output of generator 13, direct supply voltage B+$_4$ produced by this generator is provided, which voltage is also provided at an output of generator unit 4. In addition, the direct supply voltage produced by generator 13 is fed back, as voltage actual value U$_{ist4}$, to controller 12, and is taken into account by this controller in the determination of generator control signals g4. In addition, controller 12 has a measurement voltage input E4 and a monitor output A4. Measurement voltage input E4 of controller 12 is connected to monitor output A3 of controller 10 of third generator unit 3.

According to the present invention, the measurement voltage inputs and the monitor outputs of controllers 6, 8, 10, and 12 are used for a different purpose in an initialization phase than in later parallel operation. In the initialization phase, the named terminals are used for the assignment of master function and slave function, and, if needed, also for address assignment for parallel operation. During the subsequent parallel operation, a measurement voltage is supplied to the measurement voltage input of controller 6 performing the master function, and controller 6 determines generator control signal g1 on the basis of this supplied measurement voltage. At monitor output A1 of controller 6, a monitor signal is outputted that describes the utilization of generator 7. As is explained in more detail below, this monitor signal is supplied to generator units 2, 3, and 4, in order to bring the degree of utilization of all generators 7, 9, 11, and 12 into agreement.

This is explained in more detail in the following:

After the engine is started, or after a reset process, the display device is at first in the initialization phase. In this initialization phase, at first a positive direct voltage, derived from reference voltage terminal U$_{Ref}$, is adjacent to measurement voltage input E1 of controller 6 of first generator unit 1; this positive direct voltage is for example the battery voltage of the motor vehicle. At the same time, measurement voltage inputs E2, E3, and E4 are at ground.

Controller 6 of first generator unit 1 recognizes, on the basis of the present positive direct voltage, that it, or first generator unit 1, should assume the master function for the following parallel operation, and assigns itself this master function. Controllers 8, 10, and 12 of second, third, and fourth generator units 2, 3, 4 recognize, on the basis of the present ground potential, that they, or generator units 2, 3, 4, should assume the slave function for the subsequent parallel operation, and each assigns itself this slave function.

If an address assignment is also required, then controller 6 of first generator unit 1 assigns itself the address "1" after receiving the named positive direct voltage, and in addition provides, at its monitor output A1, an identifier signal k1 that is supplied to measurement voltage input E2 of controller 8 of downstream second generator unit 2.

On the basis of transmitted identifier signal k1, controller 8 recognizes that the controller connected before it has assigned itself the address "1," and assigns itself the address "2." In addition, it provides at its monitor output A2 an identifier signal k2 that is supplied to measurement voltage input E3 of controller 10 of downstream third generator unit 3.

On the basis of transmitted identifier signal k2, controller 10 recognizes that the controller connected before it has assigned itself the address "2," and assigns itself the address "3." In addition, it provides at its monitor output A3 an identifier signal k3 that is supplied to measurement voltage input E4 of controller 12 of downstream fourth generator unit 4.

On the basis of transmitted identifier signal k3, controller 12 recognizes that the controller connected before it has assigned itself the address "3," and assigns itself the address "4."

When this address assignment has terminated, the controllers then transmit their respective addresses to a control device (not shown) that requires the addresses during later operation.

When the initialization phase has terminated, the depicted device then goes into parallel operation. A criterion for the termination of the initialization phase is for example the time of the termination of the transmission of the addresses to the control device (not shown), or the expiration of a prespecified time span after the starting of the engine, or after the system reset has taken place.

In parallel operation, measurement voltage inputs E1, E2, E3, E4 and monitor outputs A1, A2, A3, A4 of the controllers have different functions than in the initialization phase.

In parallel operation, controller 6 of generator unit 1 performing the master function uses the measurement voltage, derived from a voltage measurement point and supplied to it via its measurement voltage input E1, to determine generator control signals g1 for generator 7. This determination also makes use of actual voltage $U_{ist1}$, derived from the generator output. In addition, in parallel operation controller 6 provides at its monitor output A1 a monitor signal m that is supplied to measurement voltage input E2 of controller 8 of second generator unit 2. This monitor signal m contains an item of information concerning the utilization of generator 7 of first generator unit 1, and is used by controller 8 to produce generator control signal g2 in such a way that the utilization of generator 9 of second generator unit 2 is brought into agreement with the utilization of generator 7 of first generator unit 1. In addition, controller 8 provides, at its monitor output A2, the named monitor signal m in unaltered form.

From there, monitor signal m is also supplied to controller 10 of the third generator unit, via its measurement voltage input E3. Controller 10 uses monitor signal m in order to produce generator control signal g3 in such a way that the utilization of generator 11 of third generator unit 3 is brought into agreement with the utilization of generator 7 of first generator unit 1 and with the utilization of generator 9 of second generator unit 2. In addition, controller 10 provides, at its monitor output A3, the named monitor signal m in unaltered form.

From there, monitor signal m is also supplied to controller 12 of fourth generator unit 4, via its measurement voltage input E4. Controller 12 uses monitor signal m to control generator control signal g4 in such a way that the utilization of generator 13 of fourth generator unit 4 is brought into agreement with the utilization of generator 7 of first generator unit 1, with the utilization of generator 9 of second generator unit 2, and with the utilization of generator 11 of third generator unit 3.

The following table illustrates the different uses of the measurement voltage inputs and monitor outputs of the controllers during the initialization phase and during later parallel operation.

TABLE 1

|    | Initialization phase | Parallel operation |
|----|---------------------|--------------------|
| E1 | Assignment of master function; assignment of address 1 | Reception of the measurement voltage for the generation of g1 |
| A1 | Outputting of identifier signal k1 | Outputting of monitor signal m |
| E2 | Assignment of slave function; assignment of address 2 | Reception of the measurement voltage for the generation of g2 |
| A2 | Outputting of identifier signal k2 | Outputting of monitor signal m |
| E3 | Assignment of slave function; assignment of address 3 | Reception of the measurement voltage for the generation of g3 |
| A3 | Outputting of identifier signal k3 | Outputting of monitor signal m |
| E4 | Assignment of slave function; assignment of address 4 | Reception of the measurement voltage for the generation of g4 |
| A4 | Outputting of identifier signal k4 | Outputting of monitor signal m |

The invention claimed is:

1. A method for providing a supply voltage in a vehicle using a plurality of generator units connected in parallel, wherein each generator unit includes a controller and a generator, wherein each controller includes a measurement voltage input and a monitor output, and wherein the supply voltage is provided at a combined common output of the generator units connected in parallel, the method comprising:
   in an initialization phase, using the measurement voltage inputs and the monitor outputs of the controllers for assignment of a master function, assignment of a slave function, and address assignment for parallel operation, wherein:
      the address assignment includes the controller of a generator unit performing the master function assigning itself an address and providing at its monitor output an identifier signal that contains information about the address of the generator unit performing the master function;
      the identifier signal is supplied to the measurement voltage input of the controller of a downstream generator unit;
      the controller of the downstream generator unit assigns itself an address on the basis of the identifier signal; and
      the controller of the downstream generator unit provides at its monitor output another identifier signal that contains information about the address of the downstream generator unit; and
   in a subsequent parallel operation:
      generating, using the controller of the generator unit performing the master function, a generator control signal for the generator of the generator unit performing the master function, wherein the generator control signal is generated as a function of a voltage supplied to the measurement voltage input of the controller of the generator unit performing the master function;
      outputting, at the monitor output of the controller of the generator unit performing the master function, a monitor signal describing the utilization of the generator of the generator unit performing the master function; and
      supplying the monitor signal outputted at the monitor output of the controller of the generator unit performing the master function to the measurement voltage inputs of the controllers of the generator units performing the slave function, in order to bring the degree of utilization of the generators into agreement.

2. The method as recited in claim 1, wherein the master function is assigned, in the initialization phase, based on a direct voltage value of the supplied voltage applied to the measurement voltage input of the controller of the generator unit that subsequently performs the master function during the parallel operation.

3. The method as recited in claim 2, wherein the direct voltage value is of a vehicle electrical system voltage.

4. The method as recited in claim 2, wherein the direct voltage value is provided by a control device.

5. The method as recited in claim 2, wherein:
   in the initialization phase, the measurement voltage inputs of the controllers of the generator units that subsequently perform the slave function during the parallel operation are set to a reference potential; and
   the controllers of the generator units that subsequently perform the slave function during the parallel operation are assigned the slave function on the basis of the reference potential.

6. The method as recited in claim 1, wherein the measurement voltage input of the controller of the generator unit that performs the master function during the parallel operation is connected to a direct voltage terminal providing a direct voltage value of the supplied voltage.

7. The method as recited in claim 6, wherein the direct voltage terminal is a direct voltage terminal of a control device.

8. The method as recited in claim 7, wherein the direct voltage value is of a battery voltage.

9. The method as recited in claim 1, wherein the measurement voltage input of the controller of at least one of the plurality of generator units is connected to the monitor output of the controller of at least one other of the plurality of generator units.

10. A system for providing a supply voltage in a vehicle, the system comprising:
  a plurality of generator units connected in parallel;
  wherein:
    each generator unit includes a controller and a generator;
    each controller includes a measurement voltage input and a monitor output;
    the supply voltage is provided at a combined common output of the generator units connected in parallel;
    the system is configured to implement an initialization phase during which the system uses the measurement voltage inputs and the monitor outputs of the controllers for assignment of a master function, assignment of a slave function, and address assignment for parallel operation, the address assignment including the controller of a generator unit performing the master function assigning itself an address and providing at its monitor output an identifier signal that contains information about the address of the generator unit performing the master function;
  in the initialization phase:
    the identifier signal is supplied to the measurement voltage input of the controller of a downstream generator unit;
    the controller of the downstream generator unit assigns itself an address on the basis of the identifier signal; and
    the controller of the downstream generator unit provides at its monitor output another identifier signal that contains information about the address of the downstream generator unit; and
  the system is configured to perform a parallel operation subsequent to the initialization phase in which:
    the controller of the generator unit performing the master function generates a generator control signal for the generator of the generator unit performing the master function, the generator control signal being generated as a function of a voltage supplied to the measurement voltage input of the controller of the generator unit performing the master function;
    a monitor signal describing the utilization of the generator of the generator unit performing the master function is output at the monitor output of the controller of the generator unit performing the master function; and
    the monitor signal outputted at the monitor output of the controller of the generator unit performing the master function is supplied to the measurement voltage inputs of the controllers of the generator units performing the slave function, in order to bring the degree of utilization of the generators into agreement.

11. The system as recited in claim 10, wherein the measurement voltage input of the controller of the generator unit that performs the master function during the parallel operation is connected to a direct voltage terminal providing a direct voltage value of the supplied voltage.

12. The system as recited in claim 11, wherein the direct voltage terminal is a direct voltage terminal of a control device.

13. The system as recited in claim 12, wherein the direct voltage value is of a battery voltage.

14. The system as recited in claim 10, wherein the measurement voltage input of the controller of at least one of the plurality of generator units is connected to the monitor output of the controller of at least one other of the plurality of generator units.

15. The system as recited in claim 10, wherein the master function is assigned, in the initialization phase, based on a direct voltage value of the supplied voltage applied to the measurement voltage input of the controller of the generator unit that performs the master function during the parallel operation.

16. The system as recited in claim 15, wherein the direct voltage value is of a vehicle electrical system voltage.

17. The system as recited in claim 15, wherein the direct voltage value is provided by a control device.

18. The system as recited in claim 15, wherein:
  in the initialization phase, the measurement voltage inputs of the controllers of the generator units that subsequently perform the slave function during the parallel operation are set to a reference potential; and
  the controllers of the generator units that subsequently perform the slave function during the parallel operation are assigned the slave function on the basis of the reference potential.

* * * * *